United States Patent [19]

Takemasa

[11] Patent Number: 5,351,499
[45] Date of Patent: Oct. 4, 1994

[54] REFRIGERANT COMPOSITION AND BINARY REFRIGERATION SYSTEM USING IT

[75] Inventor: Kazuo Takemasa, Ota, Japan
[73] Assignee: Sanyo Electric Co., Ltd., Osaka, Japan
[21] Appl. No.: 44,466
[22] Filed: Apr. 9, 1993
[30] Foreign Application Priority Data Apr. 10, 1992 [JP] Japan .................. 4-090904

[51] Int. Cl.$^5$ .............................................. C09K 5/00
[52] U.S. Cl. ...................................... 62/114; 252/67
[58] Field of Search .................. 62/114, 175, 335; 252/67

[56] References Cited

U.S. PATENT DOCUMENTS

| | | | |
|---|---|---|---|
| 4,436,641 | 3/1984 | Stelz et al. | 252/68 |
| 4,482,465 | 11/1984 | Gray | 252/67 |
| 4,622,825 | 11/1986 | Larue et al. | 62/102 |
| 4,679,403 | 7/1987 | Yoshida et al. | 62/114 |
| 4,758,366 | 7/1988 | Parekh | 252/68 |
| 4,788,829 | 12/1988 | Takemasa | 62/335 |
| 5,062,985 | 11/1991 | Takemasa | 252/67 |

FOREIGN PATENT DOCUMENTS 320388 1/1991 Japan .
388889 1/1991 Japan .

Primary Examiner—Henry A. Bennet
Assistant Examiner—William C. Doerrler
Attorney, Agent, or Firm—Ronald R. Snider

[57] ABSTRACT

A refrigerant composition capable of attaining a temperature as low as −80° C., without using regulated refrigerants having a high potential of destroying the ozonosphere and capable of being used as a substituent refrigerant for R503 in view of refrigerating or other performance is provided. A refrigerant composition comprises an azeotropic mixture of trifluoromethane and hexafluoromethane.

9 Claims, 1 Drawing Sheet

REFRIGERANT COMPOSITION AND BINARY REFRIGERATION SYSTEM USING IT

BACKGROUND OF THE INVENTION

The present invention relates to a refrigerant composition for use in refrigeration systems, and which has potential for ozone-depletion in the ozonosphere, as well as a binary refrigeration system using the composition.

Conventionally, R12 (dichlorodifluoromethane) and R500 (an azeotropic mixture of R12 and R152a (1,1-difluoroethane)) have often been used as refrigerants for refrigeration systems. The boiling points of R12 and R500 are about $-30°$ C. and $-33°$ C., respectively, which are suitable to usual refrigeration systems. Further, even if their compressor inlet temperatures are comparatively high, their compressor outlet temperatures do not rise so high as to cause oil-sludge in the compressor. Further, R12 is highly compatible with an compressor oil and, hence, plays a role of returning the oil in the refrigerant circuit to the compressor.

On the other hand, for achieving a lower temperature region of lower than $-80°$ C., R503 (an azeotropic mixture of R23 and R13) is used. The boiling point of R503 is $-88.65°$ C., which is suitable for obtaining a low temperature.

However, it is considered that each of the abovementioned refrigerants has a risk of destroying the ozonosphere and the use thereof has now been restricted. That is, R12 constituting R500 or R13 constituting R503 is a less decomposable so-called regulated refrigerant and it has been found that when it is released in the atmosphere and reaches an ozonosphere, there is a risk of destroying the ozonosphere.

At present, refrigerants capable of substituting the above-mentioned regulated refrigerants have now been under study and search by researchers in the world.

SUMMARY OF THE INVENTION

The present invention has been accomplished in view of the foregoings and it is an object thereof to provide a refrigerant composition capable of attaining a low temperature as low as $-80°$ C., without using a regulated refrigerant having a high potential of destroying the ozono-sphere and capable of being used as a substitute refrigerant for R503 in view of refrigerating or other performance, as well as provide a binary refrigeration system capable of actually attaining a low temperature.

The refrigerant composition according to the present invention comprises an azeotropic mixture of trifluoro methane and hexafluoroethane.

Further, the refrigerant composition according to the present invention described above comprises trifluoromethane and hexafluoromethane at a mixing ratio of 39:61 by wt % basis.

Further, the refrigerant composition according to the present invention comprises a mixture of an azeotropic mixture of trifluoromethane and hexafluoromethane and an oil returning agent, in which the oil returning agent is mixed at a ratio of 0.1 to 14% by weight based on the total weight of trifluoromethane and hexafluoromethane.

Particularly, in the refrigerant composition according to the present invention as described above, n-pentane is used as the oil returning agent.

Further, in the refrigerant composition according to the present invention as described above, propane is used as the oil returning agent.

Further, the binary refrigeration system according to the present invention comprises a high temperature refrigerant circuit and a low temperature refrigerant circuit, in which refrigerants in the low temperature refrigerant circuit are condensed by refrigerants passing through a cascade condenser in the high temperature refrigerant circuit. The refrigerants sealed in the low temperature refrigerant circuit are in a refrigerant composition of a mixture comprising an azeotropic mixture of trifluoromethane and hexafluoroethane and n-pentane or propane, in which n-pentane or propane is mixed at a ratio of 0.1 to 14% by weight based on the total weight trifluoromethane and hexafluoroethane.

In the refrigerant composition according to the present invention, trifluoromethane (R23) is HFC (hydrofluorocarbon) not containing chlorine and hexafluoroethane (R116) is FC (fluorocarbon) only consisting of fluorine and carbon. Both of them are not the object legally regulated in view of the ozonedepletion, and, since the boiling points are as low as $-82.5°$ C. for trifluoromethane (R23) and $-78.5°$ C. for hexafluoroethane (R116) and the azeotropic point is about $-88°$ C., they can sufficiently provide a refrigerating performance as a substitute refrigerant for R503.

Further, since trifluoromethane (R23) has a somewhat higher specific heat ratio of 1.22, it may be a worry that the outlet temperature of a compressor rises if trifluoromethane (R23) is sealed in a refrigerant circuit. However, since hexafluoroethane (R116) having a rather lower specific heat ratio of 1.09 is mixed by a predetermined amount, rise of the outlet temperature can be suppressed. As a result, a desired refrigerating performance can be achieved and oil-sludge or oil deterioration can also be suppressed.

Further, although the azeotropic mixture of trifluoromethane (R23) and hexafluoroethane (R116) has a poor oil compatibility, the problem can be overcome by disposing an oil separator in the refrigerant circuit and completely separating the oil by the separator and returning it to the compressor, so that there is no worry for the blockage or the like of the compressor caused by lack of oil.

Further, the refrigerant composition capable of returning the oil to the compressor can be obtained with no requirement for complete separation of the oil by the oil separator. That is, n-pentane, although having high boiling point of 36.07° C., is highly compatible with the oil of the compressor and, when n-pentane is mixed by a predetermined amount to an azeotropic mixture of trifluoromethane (R23) and hexafluoroethane (R116), the oil being dissolved in n-pentane can be fed back to the compressor, so that troubles such as blockage caused by lack of oil in the compressor can be prevented. In this case, since the boiling point of n-pentane is high, if it is mixed too much, the evaporation temperature rises, sometimes failing to attain an aimed low temperature. In view of the above, n-pentane is mixed at a ratio of 0.1 to 14% by weight, by which the oil can be fed back to the compressor without rising the evaporating temperature.

Further, propane is also highly compatible with the compressor oil and, if it is mixed by a predetermined amount into an azeotropic mixture of trifluoromethane (R23) and hexafluoroethane (R116), the oil being dissolved in propane can also be fed back to the compressor, so that trouble such as blockage caused by lack of oil in the compressor can be prevented. In this case, since the boiling point of propane is as low as $-42.74°$ C., there is not so much effect on the evaporation temperature. However, since it is flammable, it involves a danger of explosion and is difficult to handle with. However, if the mixing ratio of propane is defined to 0.1 to 14% by weight, propane can be maintained in a not flammable range, so that there is no worry of explosion or the like. Therefore, if propane is mixed at a ratio of not more than 14% by weight, the oil can be fed back to the compressor while preventing the risk of explosion or the like.

Furthermore, in an actual refrigerant circuit, a low temperature at about $-83°$ C. can be attained by an evaporator while improving the oil returning and with no hazard risk of explosion or the like and it can be put to practical use as a medical freezer such as for storing blood without using regulated refrigerants.

DETAILED DESCRIPTION OF THE PREFERRED EMBODIMENT

Figure 1:
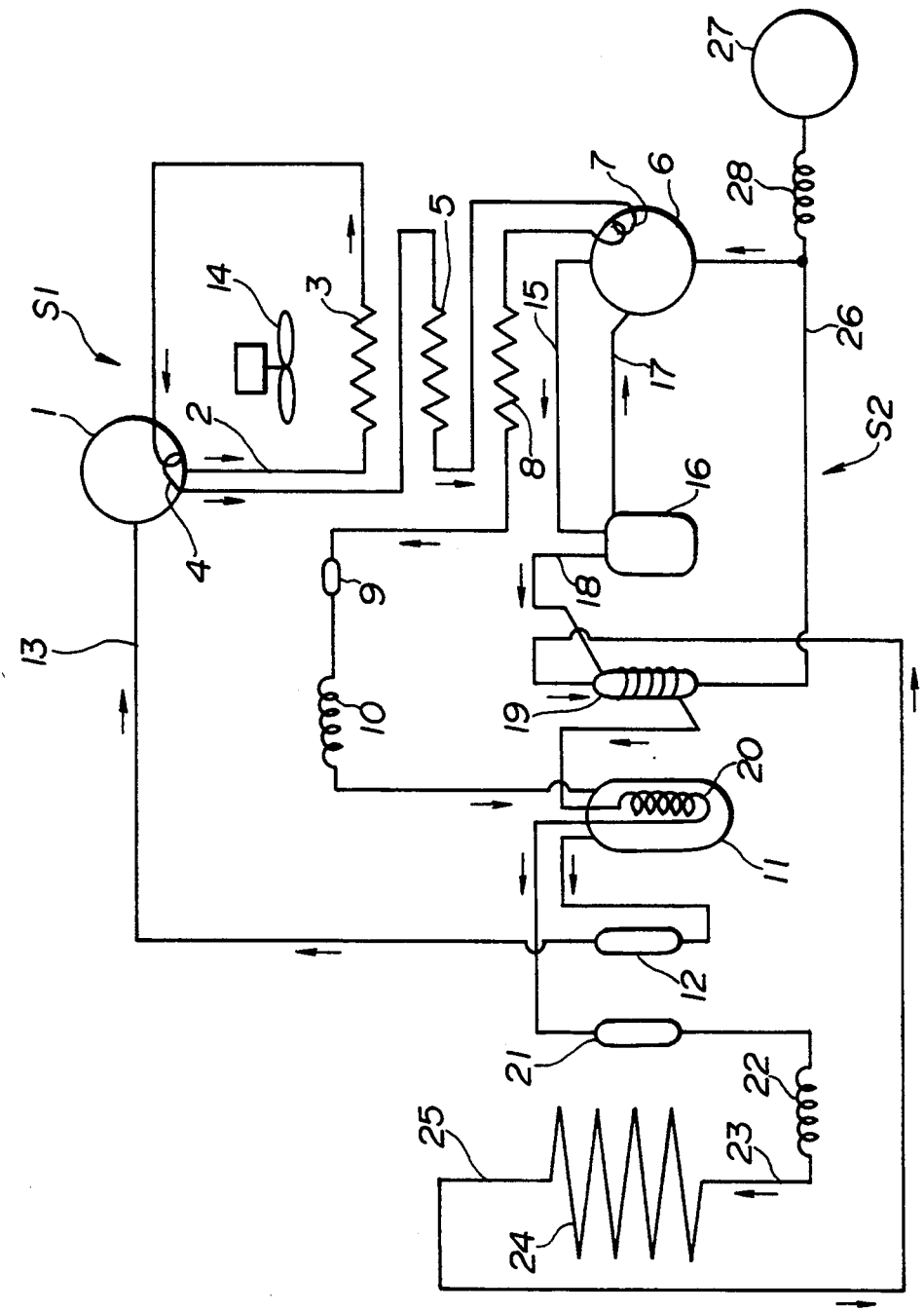
FIG. 1 is a refrigerant circuit diagram for a binary refrigeration system, in which a refrigerant composition according to the present invention is sealed.

The present invention will now be described by way of its preferred embodiment with reference to the drawings. In FIG. 1, S1 represents a high temperature refrigerating cycle while S2 represents a low temperature refrigerating cycle.

An exit pipeline 2 of a compressor 1 constituting the high temperature refrigeration cycle S1 is connected with an auxiliary condenser 3, and the auxiliary condenser 3 is connected by way of an oil cooler 4 of the compressor 1, an auxiliary condenser 5, an oil cooler 7 of a compressor 6, a condenser 8, a dryer 9 and a capillary tube 10 constituting the low temperature refrigeration cycle S2, successively, to a cascade condenser 11 and then connected by way of a liquid receiver 12 and through a suction pipeline 13 to the compressor 1. Reference numeral 14 denotes a cooling blower for each of the condensers 3, 5 and 8.

The outlet pipeline 15 of the compressor 6 in the low temperature refrigerant cycle S2 is connected to an oil separator 16 and a compressor oil separated therein is returned by way of a return pipeline 17 to the compressor 6. On the other hand, the refrigerants flow into a pipeline 18, conduct heat exchange in an inlet heat exchanger 19, then are condensed by passing through a pipeline 20 in the cascade condenser 11, flow through a dryer 21 and a capillary tube 22 and from an inlet pipe 23 to an evaporator 24, leave the evaporator from the outlet pipe 25, and then return through an inlet heat exchanger 19 and from the inlet pipe line 26 of the compressor 6 into the compressor 6. In the drawing, reference numeral 27 denotes an expansion tank, which is connected by way of a capillary tube 28 to the inlet pipeline 26.

In the high temperature refrigerating cycle S1, R22 (chlorodifluoromethane, $CHClF_2$) is sealed. The boiling point of R22 under an atmospheric pressure is $-40.75°$ C. R22 is condensed in each of the condensers 3, 5 and 8, depressurized in the capillary tube 10 and flows into and evaporates from the cascade condenser 11. The temperature of the cascade condenser 11 is about $-40°$ C.

In the low temperature refrigerating cycle S2, an azeotropic mixture of R23 (trifluoromethane, $CHF_3$) and R116 (hexafluoroethane, $C_2F_6$) and n-pentane ($C_5H_{12}$) is sealed. The mixing ratio of R23 and R116 is 39:61 by weight, and n-pentane is mixed in the composition at a ratio of 0.1 to 14% by weight based on the total weight of R23 and R116. As a result, a refrigerant composition having an azeotropic point as low as $-88°$ C. is sealed. Then, the refrigerants and the compressor oil discharged from the compressor 6 flow into the oil separator 16. Then, they are separated into a gas phase and a liquid phase and, since most portion of the oil is the liquid phase, they can return from the return pipeline 17 to the compressor 6. The refrigerants and the oil in the gas phase pass through the pipeline 18 and conduct heat exchange in the inlet heat exchanger 19, and are further cooled and condensed in the cascade condenser 11 by evaporation of the refrigerants in the high temperature refrigerating cycle S1. Subsequently, they are depressurized in the capillary tube 22 and then caused to flow into and evaporated from the evaporator 24. The evaporator 24 is attached in a heat-exchanging manner to the wall surface of a refrigeration chamber not illustrated for cooling the inside of the chamber. In this case, the evaporation temperature of the evaporator 24 reaches as low as $-88°$ C.

In the refrigerant composition sealed in the low temperature side refrigeration cycle S2 in the thus constituted binary refrigeration system, trifluoromethane (R23) is HFC not containing chlorine and hexafluoroethane (R116) is FC only consisting of fluorine and carbon, both of which are not legally regulated for the problem of ozone-depletion. In addition, since their boiling points are as low as $-82.5°$ C. for trifluoromethane (R23) and $-78.5°$ C. for hexafluoroethane (R116), and the azeotropic point is about $-88°$ C., the refrigerant composition can sufficiently provide a refrigerating performance as a substituent refrigerant for R503.

Further, since trifluoromethane (R23) has a somewhat higher specific heat ratio of 1.22, it may be a worry that the outlet temperature of the compressor 6 may rise in the refrigerant circuit. However, since hexafluoroethane (R116) having a specific heat ratio as low as 1.09 is mixed by 61% by weight, rise of the outlet temperature can be suppressed. As a result, a desired refrigerating performance can be attained and oil-sludge or oil deterioration can be suppressed.

In this case, the value K for the specific heat ratio (Cp/Cv) gives a significant effect on the exhaust gas temperature of the compressor in adiabatic compression as shown by the following formula and the value is smaller as the molecular weight of the composition is greater.

$$T_2 = T_1(P_2/P_1)^{k-1/k}$$

where $T_1$: inlet gas temperature (°K)
 $T_2$: outlet gas temperature (°K)
 $P_1$: inlet pressure (kg/cm² abs)
 $P_2$: outlet pressure (kg/cm² abs)
 K: specific heat ratio (Cp/Cv)
 $C_p$: specific heat at constant pressure
 $C_v$: specific heat at constant volume Further the azeotropic mixture of trifluoromethane (R23) and hexafluoroethane (R116) shows poor oil compatibility, but this problem can be solved by mixing n-pentane by not more than 14% by weight, particularly, from 0.1 to 14% by weight based on the total weight of trifluoromethane (R23) and hexafluoroethane (R116). That is, although n-pentane has a boiling point as high as +36.07° C., it is highly compatible with the compressor oil and when n-pentane is mixed within a range of not more than 14% by weight, the oil being dissolved in n-pentane can be fed back as far as the compressor, so that trouble such as blockage caused by lack of oil in the compressor can be prevented. As a result, the oil can be returned to the compressor 6 with no particular requirement for complete separation in the oil separator 16. In this case, since n-pentane has a high boiling point, if it is mixed too much, evaporation temperature rises, failing to obtain an aimed low temperature. However, by mixing n-pentane at a ratio from 0.1 to 14% by weight based on the total weight of trifluoromethane (R23) and hexafluoromethane (R116), the oil can be fed back to the compressor without rising the evaporation temperature while keeping n-pentane non-flammable.

In this way, according to the binary refrigeration system in this embodiment, a temperature as low as about −88° C. can be attained by the evaporator while improving the oil return and with no hazard of explosion or the like, so that it can be put to practical use as a medical freezer such as for blood storing without using the regulated refrigerant.

Further, since n-pentane is not produced by factories, it can be easily available and practical in a case of using it in a freezer or the like.

In addition, since each of trifluoromethane (R23), hexafluoroethane (R116) and n-pentane is in a gaseous state, operability upon sealing or service performance can be improved.

Although descriptions have been made in this embodiment to a mixture of trifluoromethane (R23), hexafluoroethane (R116) and n-pentane, similar effect can also be attained by mixing R290 (propane, $C_3H_8$) at the same ratio instead of n-pentane. That is, propane is also highly compatible with the compressor oil and, if propane is mixed by 14% by weight based on the total weight of trifluoromethane (R23) and hexafluoroethane (R116), oil being dissolved in propane can be fed back as far as the compressor 6, so that trouble such as blockage caused by lack of oil in the compressor 6 can be prevented. In this case, since propane has a boiling point as low as −42.75° C., there is not so much effect on the evaporation temperature. However, since propane is flammable, it involves a risk of an explosion and is difficult to handle with. However, if the mixing ratio of propane is made to not more than 14% by weight, that is, from 0.1 to 14% by weight based on the total weight of trifluoromethane (R23) and hexafluoromethane (R116), propane can be maintained in a non-flammable area there is no worry of explosion or the like.

According to the present invention as described above, since trifluoromethane (R23) is HFC not containing chlorine and hexafluoroethane (R116) is FC only consisting of fluorine and carbon, both of which are legally regulated in view of ozonosphere depletion, and since the boiling points are as low as −82.5° C. for trifluoromethane (R23) and −78.5° C. for hexafluoroethane (R116) and the azeotropic point is about at −88° C., it can provide a sufficient refrigerating performance as a substituent refrigerant for R503.

Further, since trifluoromethane (R23) has a somewhat high specific heat ratio of 1.22, if it is sealed in a refrigerant circuit, it may give a worry of rising the outlet temperature of the compressor. However, since hexafluoroethane (R116) having a rather low specific heat ratio of 1.09 is mixed by a predetermined amount, rise of the outlet temperature can be suppressed. As a result, if the composition is sealed in the refrigeration system, a desired refrigerating performance can be achieved and oil-sludge or oil deterioration can be suppressed.

What is claimed is:

1. A refrigerant composition comprising a mixture of an azeotropic mixture of trifluoethane and hexafluoroethane and an oil returning agent, in which the oil returning agent is mixed at a ratio from 0.1 to 14% by weight based on the total weight of trifluoromethane and hexafluoromethane.

2. A refrigerant composition as defined in claim 1, wherein the oil returning agent is n-pentane.

3. A refrigerant composition as defined in claim 1, wherein the oil returning agent is propane.

4. A binary refrigeration system having a high temperature refrigerant circuit and a low temperature refrigerant circuit, in which refrigerants in said low temperature refrigerant circuit are condensed by refrigerants passing through a cascade condenser in said high temperature refrigerant circuit, wherein the refrigerants sealed in said low temperature refrigerant circuit are a refrigerant composition comprising a mixture of an azeotropic mixture of a trifluoromethane and hexafluoroethane, and n-pentane, in which n-pentane is mixed at a ratio from 0.1 to 14% by weight based on the total weight for trifluoromethane and hexafluoroethane.

5. A refrigerant composition as defined in claim 1, wherein the oil returning agent is a hydrocarbon.

6. A refrigerant composition as defined in claim 1, wherein said oil returning is not flammable when the composition is released to the atmosphere.

7. A binary refrigerant system in accordance with claim 4, wherein said n-pentane does not evaporate in the refrigerant circuit.

8. A binary refrigeration system having a high temperature refrigerant circuit and a low temperature refrigerant circuit, in which refrigerants in said low temperature refrigerant circuit are condensed by refrigerants passing through a cascade condenser in said high temperature refrigerant circuit, wherein the refrigerants sealed in said low temperature refrigerant circuit are a refrigerant composition comprising a mixture of an azeotropic mixture of a trifluoromethane and hexafluoroethane, and propane, in which propane is mixed at a ratio from 0.1 to 14% by weight based on the total weight from trifluoromethane and hexafluoroethane.

9. A binary refrigerant system in accordance with claim 4, wherein said propane does not evaporate in the refrigerant circuit.

* * * * *